United States Patent
Oetiker

(10) Patent No.: US 6,511,380 B1
(45) Date of Patent: Jan. 28, 2003

(54) PRE-ASSEMBLED BELLOWS-TYPE ARRANGEMENT FOR COVERING ARTICULATED SHAFTS

(75) Inventor: Hans Oetiker, Horgen (CH)

(73) Assignee: Hans Oetiker AG Maschinen-und Apparatefabrik, Horgen (CH)

( * ) Notice: Subject to any disclaimer, the term of this patent is extended or adjusted under 35 U.S.C. 154(b) by 0 days.

(21) Appl. No.: 09/806,386

(22) PCT Filed: Sep. 13, 1999

(86) PCT No.: PCT/CH99/00428

§ 371 (c)(1),
(2), (4) Date: Jun. 28, 2001

(87) PCT Pub. No.: WO00/20772

PCT Pub. Date: Apr. 13, 2000

(30) Foreign Application Priority Data

Oct. 2, 1998 (EP) .............................................. 98118717

(51) Int. Cl.[7] ................................................. F16D 3/84
(52) U.S. Cl. ....................................... 464/175; 277/636
(58) Field of Search ................................ 464/173, 175; 24/20 EE; 29/521; 277/636; 403/51

(56) References Cited

U.S. PATENT DOCUMENTS

| | | | | |
|---|---|---|---|---|
| 293,831 A | * | 2/1884 | Wickers ............... | 24/20 EE X |
| 809,756 A | * | 1/1906 | Staude ................. | 24/20 EE X |
| 5,150,503 A | | 9/1992 | Müller ................. | 24/20 EE |
| 5,430,912 A | * | 7/1995 | Renzo et al. ......... | 24/20 EE X |
| 5,853,178 A | * | 12/1998 | Wydra et al. .......... | 464/175 X |
| 6,139,027 A | * | 10/2000 | Biekx .................. | 464/175 X |
| 6,421,886 B1 | * | 7/2002 | Oetiker ................ | 24/20 EE X |

FOREIGN PATENT DOCUMENTS

| | | |
|---|---|---|
| DE | 196 20 726 C | 9/1997 |
| EP | 0 545 619 A2 | 6/1993 |
| EP | 0 648 949 A1 | 4/1995 |
| EP | 0 809 034 A1 | 11/1997 |

* cited by examiner

*Primary Examiner*—Greg Binda
(74) *Attorney, Agent, or Firm*—Pearne & Gordon LLP

(57) ABSTRACT

The invention relates to an arrangement for covering a shaft-type mechanism and/or a joint-type connection of two shafts or a steering gear, comprising a bellows-type element (10). Said bellows-type element (10) has a collar-type essentially ring-shaped section (14) at each end, with an open clamping, pressing or shrink ring (20) or a so-called open hose clamp located thereon. Said hose clamp is pre-stressed in the direction of the centre in such a way that the two open ends (22, 24) mutually overlap each other and the ring or the clamp is automatically held tight on the respective section.

8 Claims, 4 Drawing Sheets

PRE-ASSEMBLED BELLOWS-TYPE ARRANGEMENT FOR COVERING ARTICULATED SHAFTS

BACKGROUND OF THE INVENTION

The present invention relates to an arrangement provided for sheathing a shaft-like element, and/or a connection between two shafts—or a joint—and a method for arranging a bellows-like sheathing of a drive shaft.

Bellows-like arrangements are known for sheathing shaft-like elements, connections of shafts, such as in particular join connections or drive shafts, gear shafts and the like. Especially in the auto industry, drive shafts, gear joints, etc. are sheathed by means of rubber bellows joints, e.g. in order to protect the joints and prevent leakage of the lubrication.

As a rule, rubber bellows joints are mounted on the drive shafts with, already mounted at each end of the bellows, closed hose clamps or clamping rings or press rings such as the commercially very well known "Oetiker" clamps that are clamped or contracted on by means of suitable tools or devices for solid, tight connection of the bellows with the respective shaft sections.

With this pre-mounted, already closed arrangement of the clamps or clamping or press rings, on the one hand cost-intensive measures are necessary on the bellows so that the non-contracted or unclamped, loose mounted clamps or rings are held on collar-like end sections, and in addition, after loose mounting of the bellows on the drive shaft to be sheathed, any defective clamps or rings can no longer be replaced and/or additional clamps or rings or replacement clamps or ring cannot be mounted.

A still open clamping ring already pre-mounted on a rubber bellows end is indeed proposed in EP 0 545 629 that is held "automatically" on a mounting section at each end of the rubber bellows. After mounting the rubber ring, however, this clamping ring must first be clamped and closed in a first mounting step by applying a tool, to then be compressed in a second mounting step if necessary. The latter is true especially when, due to manufacturing tolerances, the clamping or press ring does not already allow secure mounting of the bellows by clamping.

SUMMARY OF THE INVENTION

It is therefore the technical problem of the present invention to propose a measure such that already loosely pre-mounted clamps or clamping or press rings can also be easily held on a bellows and can be easily replaced, or additional clamps or rings can be mounted that subsequently allow a secure, solid mounting of the bellows preferably only by means of one further processing step.

It is proposed that an arrangement intended for sheathing a shaft-like element and/or a connection between two shafts or a drive shaft and having a bellow-like element which in turn has at each end a collar-like section designed largely annularly, with, mounted on it, an open clamping, press or contracting ring or a so-called open hose clamp that is pre-stressed toward the center such that the two ends of the ring or clamping belt mutually overlap and the ring or the clamp is automatically retained on the section. In the two belt ends of the clamp or ring, meshing or interlocking sections are provided in order, when the ring or the clamp widens, to mesh or interlock and snap the ring belt or clamp belt closed.

Also proposed is a method for arranging a bellows-like sheathing of a drive shaft or a gear joint, for example to protect the lubrication of a shaft connection or a joint, in connection with which at each end the bellows-like sheathing is provided at a collar-like end section with an open clamping, press or contracting ring or a hose clamp that is pre-stressed toward the center and the ends of which are provided with corresponding contours to form a meshing or interlocking connection of the ends, and these ends mutually overlap due to the pre-stressing such that subsequently at least the one collar section at each end is slid in sleeve-like manner or pushed on a largely circular support[ section provided an a shaft or in the area of the shaft end. This support section is provided for mounting and holding one of the ends of the bellows-like sheathing, in connection with which, when the collar-like end of the bellows-like sheathing is slid in sleeve-like manner or pushed on and widened, the clamping, press or contracting ring or the hose clamp is widened such that the two ends of the ring or the clamp are moved far enough in the belt-widening direction that the meshing or interlocking solid connection of the two belt ends arises due to the contours provided for, and then, by means of a press, contracting or clamping step, the ring or the clamp is fastened on the collar-like end in the diameter-reducing direction to produce the solid connection between the bellows-like element and the shaft.

The arrangement and, respectively, the method defined according to the invention is of course suitable for sheathing shafts or shaft-like elements of different kinds, for sheathing or protecting joint-like connections, drive shafts, gear shafts, etc. The widest variety of bellows-like elements made of the widest variety of elastic materials such as rubber, elastomer, thermoplastic plastics, etc. can also be used for the arrangements and/or methods according to the invention, as can the widest variety of hose clamps, clamping or press rings as well. In this connection; the ends joining the two belt ends of the clamps or the rings can have the widest variety of designs. The essential point is that the two ends have a contour which, when the clamp or the belt is widened, allows a meshing or interlocking connection or allows them to slide into each other or snap in. In this connection, the following clamps should be pointed out, for example: those described in EP 570 742, EP 591648, EP 503 609, CH 561383, CH 555 026, CH 669 642, CH 677 010, CH 679 945, EP 543 338, as well as so-called "Oetiker" clamps, as are widely used commercially and very well known, just to name a few.

The major advantage of the method proposed according to the invention is in the fact that the pre-stressed clamping, press or contracting ring selected according to the invention can be designed smaller and more accurate and is thereby less expensive to manufacture. In addition, there is a smaller contracting path than there is, for example, with an already mounted, closed ring.

Another advantage results from the fact that the ring according to the invention can be inserted from the side and can be precisely positioned where it is to be mounted in the end. In this way, a contracting or press ring can also be mounted at a specific location that is provided with corresponding production or mounting data, which should be placed precisely at that location. These—if necessary—important details on the contracting or press ring placed according to the invention can thus be reviewed later; for example, they can be stamped into the press ring.

BRIEF DESCRIPTION OF THE DRAWINGS

The invention is described in more detail below with reference to the attached figures. They show.

DETAILED DESCRIPTION

Figure 1:
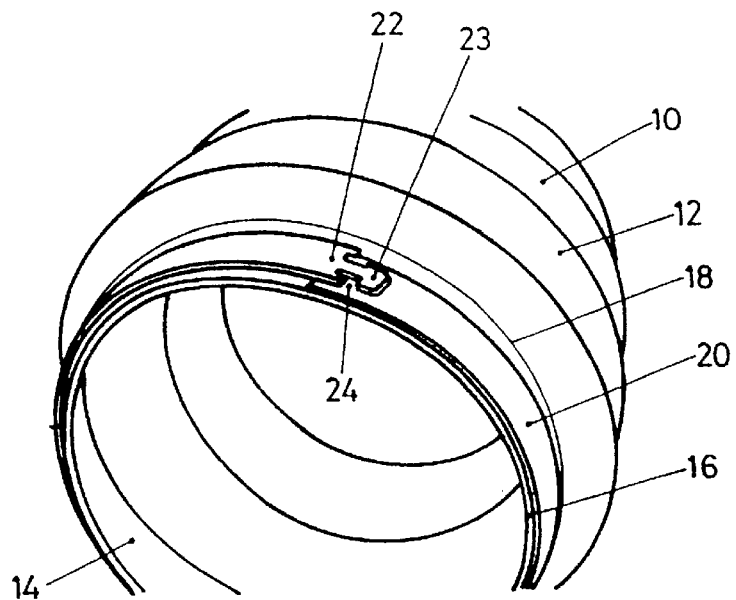
FIG. 1 in exploded view and as seen in the direction of an opening, a bellows having at one end an open contracting or press ring as proposed by the invention, FIG. 2 a cutout from FIG. 1, showing the overlapping belt ends of the contracting or press ring from FIG. 1, FIG. 3 possible designs of contracting or press rings, and FIG. 4 known from the state of the art for the pre-mounted arrangement of the press and contracting rings, FIG. 5 the contracting or press ring from FIG. 1 in the non-mounted status, FIG. 6 the bellows from FIG. 1 in the status mounted on a shaft end before compression of the press or contracting ring, FIG. 6a a rear-axle shaft, and respectively, a drive shaft by means of a bellows, corresponding to that of FIG. 6, FIG. 7 a possible design of the two belt ends of the press or contracting ring, FIG. 8 a further form of construction of the connection of the press or contracting ring, and FIG. 9 as an example, an installation for contracting or clamping the clamping ring or press ring on the bellows.
Figure 2:
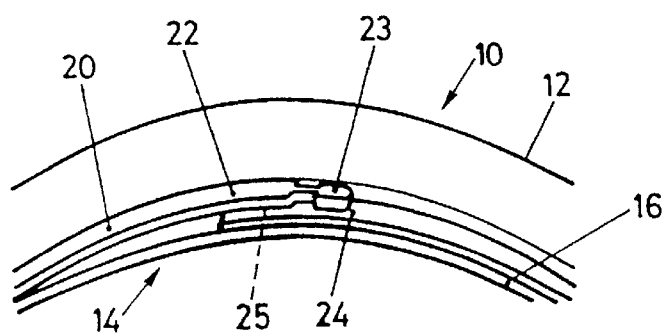

FIG. 1 shows in an exploded view as seen in the direction of the larger bellows end, an arrangement according to the invention having a bellows 10 with the individual bellows sections 12. The bellows 10 may be made of a rubber or a rubber mixture, for example, or of another suitable elastic material, such as a suitable thermoplastic plastic. On the larger collar-like end 14 visible in FIG. 1, a clamping or press or contracting ring 20 is mounted. The two ends 22 and 24 are mounted loosely and mutually overlapping, i.e., in other words, the contracting ring 20 is loose and can be removed at any time by pulling apart the two ends of the collar 14 of the bellows 10. In order for the contracting ring 20 to be firmly retained automatically on the collar 14 at each end of the bellows 10, as already mentioned it is designed pre-stressed toward the middle of the ring on the one hand, and in addition, the collar 14 preferably has a further, second edge like grading 18 designed toward the first bellows section. The edge 16 of the collar 14 as well as the grading 18 are preferably designed at such a distance from each other that the ring can be attached with its width between them. The edge 16 comprises a retaining section, such as a groove-like section, that holds the ring 20 on the collar 14 when the ring 20 is in an open, non-mounted status. In particular in FIG. 2, in which the two belt ends 22 and 24 from FIG. 1 are illustrated enlarged, it can be clearly seen that the one belt end 22 has a protruding tongue 23 or latch with sections protruding laterally, i.e., crosswise to the direction of the belt. A corresponding recess or notching 25—not shown—is provided in the other belt end 24 so that when the ring belt 20 is opened up, the latch 23 can snap into the corresponding recess 25 without loss. As can furthermore be seen in FIG. 2, that belt end is arranged directed outward that has the latch or the tongue 23.

Figure 3:
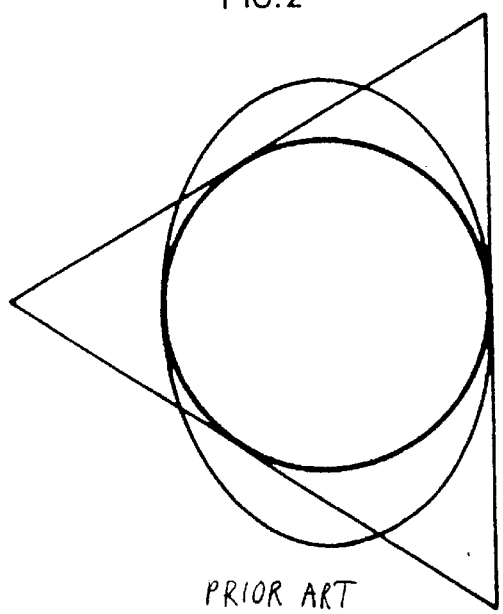

It was already attempted in the state of the art to solve at least a portion of the technical problem at the basis of this invention; i.e., to hold a not yet contracted press or clamping or contracting ring on the collar-like end of a bellows. A possible start of a solution is shown in FIG. 3, in that, for example, the belt is designed oval or elliptic in order to achieve a clamping effect vis-a-vis the collar surface. According to a further illustration from FIG. 3, the belt is arranged triangularly in order to achieve a clamping effect vis-a-vis the collar at least at three support sections.

Figure 4:
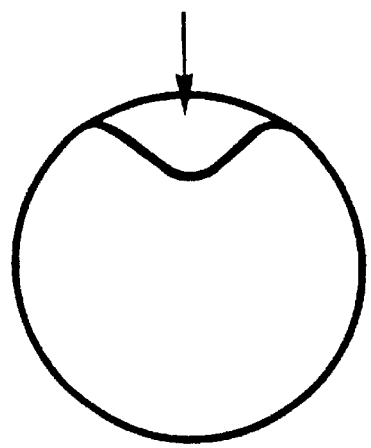

In FIG. 4, on the other hand, a further starting point for a solution is shown, in that it is also conceivable that during the pre-mounting of the already closed clamping or contracting ring, the bellows is reduced in diameter by an inward-facing deformation thereof, so that the already closed ring can be pulled on. This method is indeed possible in connection with rubber-like materials for bellows but hardly in connection with the thermoplastic materials or elastomers such as Hytrel, Anitel, etc. often used nowadays.

In addition, the potential solutions illustrated in FIG. 3 and 4 always start from already closed clamping or contracting rings, occasionally a disadvantage.

Figure 5:
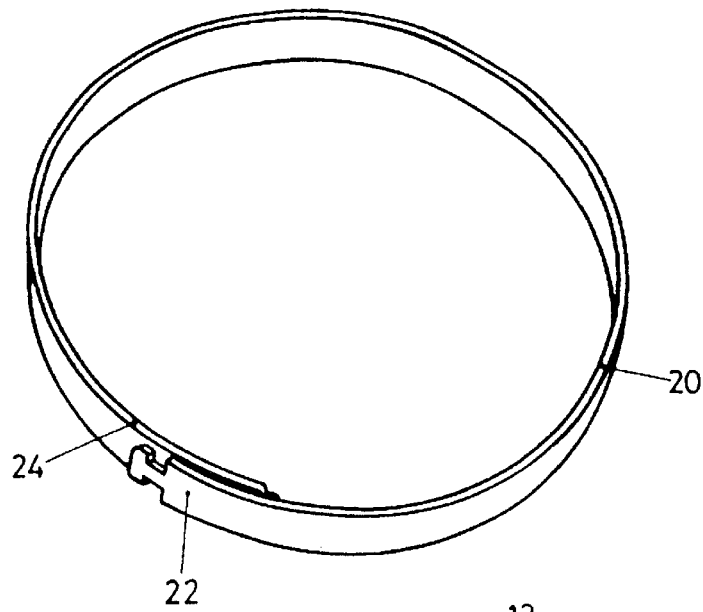

For this reason, it is proposed to use the contracting or press ring 20 shown in FIG. 5, which is designed pre-stressed toward the center, and to have the two belt ends 22 and 24 overlap in loose status. This creates a tensioning or clamping effect which automatically holds the press or contracting ring 20 on the collar-like end 14, as shown in FIG. 1.

When mounting the bellows 10 with pre-mounted contracting or press ring 20, such as a so-called multi-crimp ring (MCR) on the metal counterpiece or end of a shaft, the collarlike end 14 of the bellows is widened. The MCR overlapping with the two open belt ends in delivery condition is likewise extended due to this widening process, and the two ends automatically snap in on the same belt level, as FIG. 6 clearly shows. The latch or tongue 23 snaps into the corresponding recess 25 in the belt end 24, and due to the design of the tongue or latch 23 with the sections protruding laterally crosswise to the belt direction, the two ends are locked.

Figure 6:
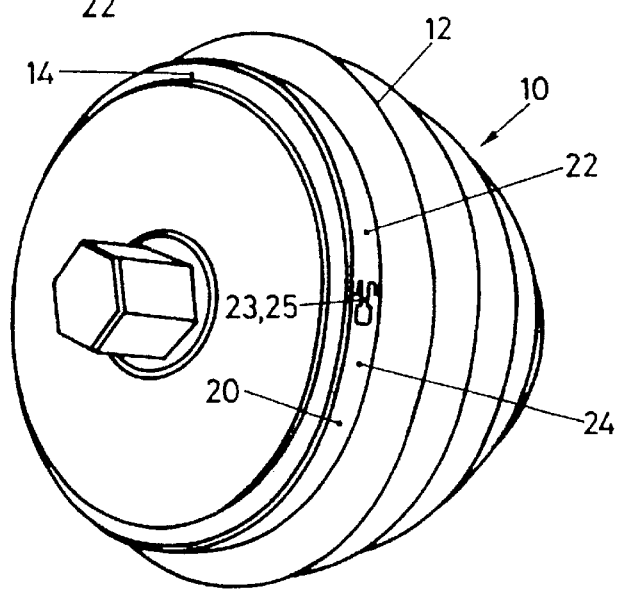
Figure 6A:
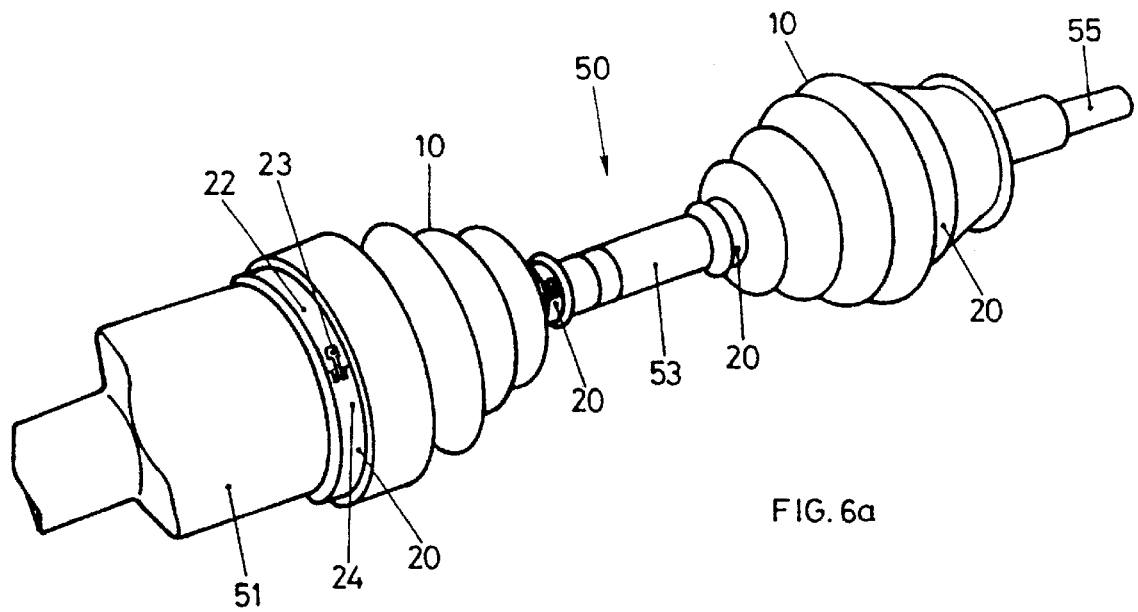

FIG. 6a shows a rear-axle shaft 50 having two joints arranged on the one hand between a drive shaft 51 and connecting shaft or steering shaft 53, and on the other hand between the connecting or steering shaft 53 and the wheel shaft or wheel-hub 55. The two joints are each sheathed by means of a bellows 10 that protects each of the joints and "secures" their lubrication. The two bellows 10 are in turn secured with contracting or press rings 20 proposed according to the invention, with the two belt ends 22 and 24 as well as the tongue 23 engaging a corresponding recess are clearly recognizable on the contracting ring near the drive shaft 51. The major advantage of the present invention again becomes clear with the help of such a rear-axle shaft or drive shaft 50, in that it can be delivered with "loose" contracting or press rings, but with no risk that these press or contracting rings may fall off. There is also the possibility at any time to remove one of the already mounted contracting or press rings even if the rear-axle shaft has already been definitively mounted, since a new, still open contracting or press ring can still be pushed laterally onto the collar to be compressed.

Figure 7:
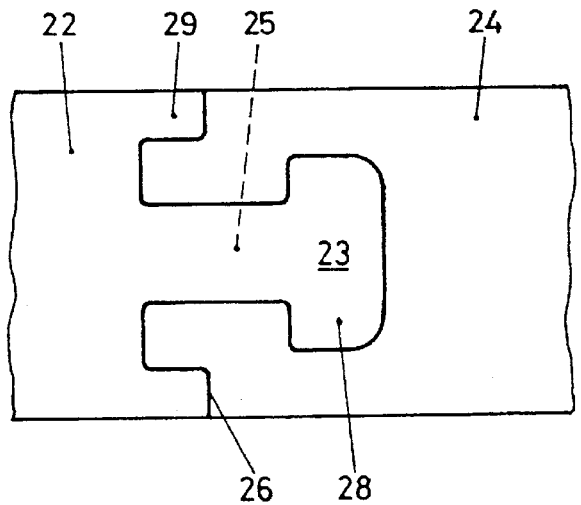
Figure 8:
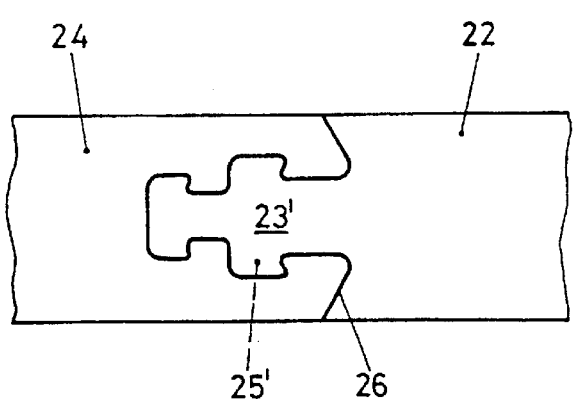

Possible forms of construction of belt ends are illustrated in FIGS. 7 and 8, for example, in connection with which in FIG. 7, the latch protruding from the one end 22 or the edge 26 has the aforementioned sections 28 protruding crosswise to the belt direction. Furthermore, the end of the belt section 22 has sections 29 protruding laterally relative to the latch 23, in order to prevent a lateral breaking out of the end areas 26 grasped from behind by the two sections 28. The latch and the corresponding recess are preferably designed such that a meshing is ensured without loss.

FIG. 8 shows a further form of construction of a connection, in connection with which the latch or tongue 23' arranged once again in the middle of the belt end 22 is mounted meshing in a corresponding recess 25'. In this form of construction, several sections protruding laterally and crosswise to the belt direction are provided that additionally have special contours.

The two belt connections or belt closures shown in FIGS. 7 and 8 are of course only examples and are only used to better comprehend the present invention. Of course, this also covers any number of other belt locks or connections that make possible an automatic meshing or interlocking connection or snapping in of the ends during the widening step of the b.

Figure 9:
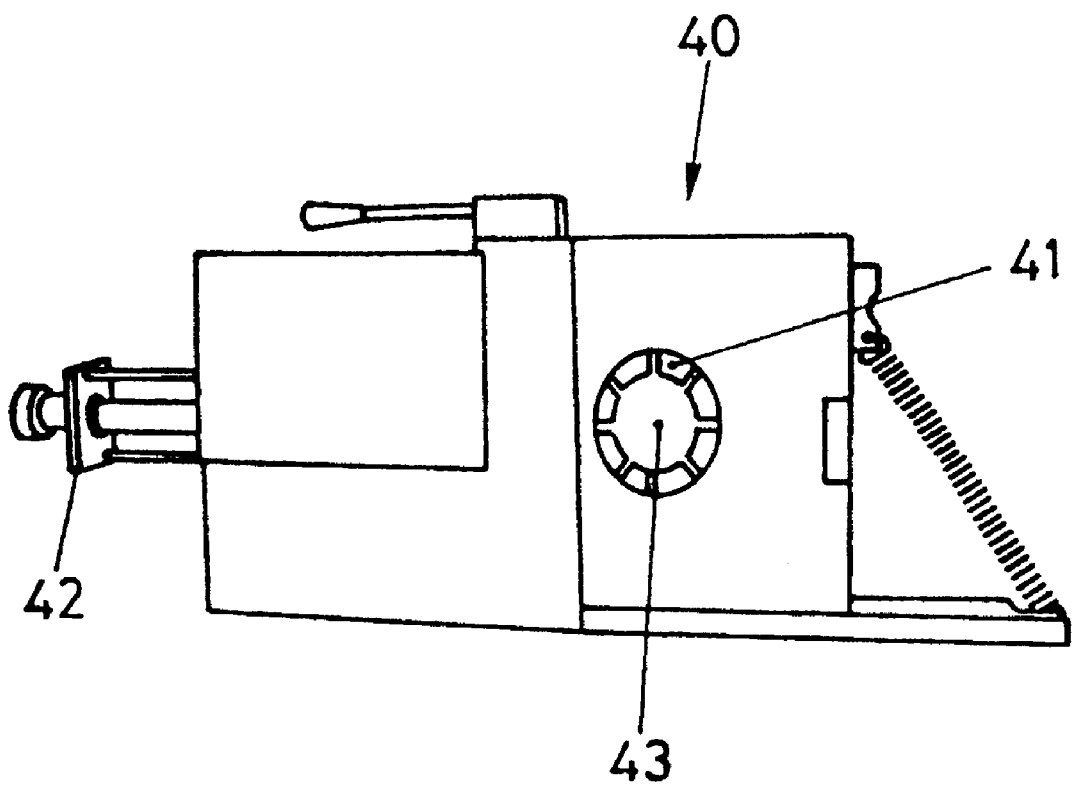

After successfully mounting the bellows on a shaft end, as shown in FIGS. 6 and 6a, only the press or contracting ring or the pre-mounted MCR then need to be clamped or compressed. Once again as an example, FIG. 9 shows such an installation that is suitable for contracting pre-mounted MCRs. In this procedure, the lock of the contracting or press ring, attached in the pre-mounted status, is sealed such that it can no longer be automatically opened or separated. The installation 40 shown in FIG. 9 has, described in simplified manner, clamping segments 41 able to be actuated annularly inward and together displaying an annular opening 43 with their inner contours. With a hydraulic or pneumatic installation 42, the individual clamping segments 41 can be pressed or driven radially inward in order to reduce the diameter of or contract the contracting or press ring.

The present new development thus includes clamping or contracting rings or so-called multi-crimp rings (MCR) with open ends and known mechanical lock. Due to the fact that these MCRs are produced with open ends, they can be manufactured with corresponding pre-stress. This pre-stress causes a spring effect in the direction of the ring center. This spring effect can be used to the effect that the ring automatically holds, will no structural adaptation on the bellows, in the area of the end collar in an appropriately provided groove, e.g. provided for receiving MCRs. This is because, as is well known, practically every model of bellows is manufactured with the aforementioned groove. This groove can be designed running throughout or also as just an individual cam arranged on the bellows periphery. A pre-mounting is thus possible, namely without any structural modification on the bellows, i.e., every mass-production bellows can be equipped with the integrated MCR, provided as a system, thereby saving a work step during definitive mounting.

The forms of construction or installations shown in FIGS. 1–9 in connection with the arrangement of bellows are of course only examples intended to explain in greater detail the inventive step or the aforementioned mounting step. The design of the bellows, particularly the material used for the bellows, and also the design of the contracting or press ring or the so-called MCR, and in turn the material used for this, may be modified in any desired manner, of course, and the invention is not limited to any form of construction. It has indeed been shown that for manufacturing the MCR, aluminum is suitable, for example but stainless steel or any other suitable metallic materials can also be used for this, of course.

What is claimed is:

1. Arrangement provided for sheathing a shaft element and/or a connection between two shafts and/or steering gears, having:
    a bellows element (10)
    a collar section (14) at each end of the bellows element designed largely annularly
    an open clamping, press or contracting ring (20) or an open hose clamp arranged on each collar section, the ring or clamp being pre-stressed toward a center of the ring or clamp such that two ends (22, 24) of the ring or clamp mutually overlap and the ring or the clamp is automatically retained on the collar section, and that in the two ends of the clamp or the ring, meshing or interlocking sections (23, 25) are provided so that when the ring or clamp is widened, the meshing or interlocking sections mesh or interlock and snap the ring or clamp closed.

2. Arrangement according to claim 1, characterized in that at least one retaining section (16) is provided on the collar section (14) in order to hold the ring or clamp in open, non-mounted status on the collar section.

3. Arrangement according to one of the claims 1 or 2, characterized in that one of the two ends of the ring or the clamp has at least one tongue or latch (23) protruding in the direction of the ring or the clamp and with sections protruding crosswise to the latch or tongue, and the other of the two ends of the ring or clamp has at least one notching or punch out (25) corresponding at least nearly to the contour of the latch or tongue, in order to receive and close them without loss during mounting of the bellows and widening of the ring or the clamp of the ring or clamp.

4. Arrangement according to claim 3, characterized in that when the clamp is open and loosely pre-mounted or when the ring is open, the one(22) of the two ends that has the tongue or latch rests facing outward on the other (24) of the two ends having the notching or punch out.

5. Arrangement according to one of the claims 1 or 2, characterized in that the clamping or contracting ring is a multi-crimp ring.

6. Arrangement according to claim 2, characterized in that the retaining section is an edge at each end, or a groove section is designed on each end of the collar in order to hold the clamp or ring in a pre-mounted status.

7. Method for arranging a bellows sheathing of a drive shaft or a gear joint, comprising steps of:
    providing an open clamping, press or contracting ring or a hose clamp at each end of the bellows sheathing at a collar end section, two ends of the open ring or clamp having corresponding contours to form a meshing or interlocking connection of the two ends, and the two ends mutually overlapping,
    pushing on or sliding at least the one collar end section in sleeve manner onto a largely circular support surface provided at the shaft end and provided for the mounting and holding one of the ends of the bellows sheathing, and when the bellows sheathing is pushed on or slid on in sleeve manner and the collar end of the bellows sheathing is widened, the clamping, press or contracting ring or the clamp is widened such that the two ends of the ring or clamp are moved in a widening direction far enough that the firm meshing or interlocking connection between the two ends is created, and
    attaching the ring or the clamp on the collar end by a pressing or contracting process in the diameter-reducing direction to produce a solid connection between the bellow and the shaft or shaft end.

8. Method according to claim 7, characterized in that the press ring or clamping ring or contracting ring or the hose clamp is pre-stressed toward a center of the ring or clamp such that the two ends of the ring or clamp mutually overlap in a loose pre-mounted status.

* * * * *

UNITED STATES PATENT AND TRADEMARK OFFICE
CERTIFICATE OF CORRECTION

PATENT NO. : 6,511,380 B1
DATED : January 28, 2003
INVENTOR(S) : Hans Oetiker

It is certified that error appears in the above-identified patent and that said Letters Patent is hereby corrected as shown below:

Title page,
Item [56], References Cited, FOREIGN PATENT DOCUMENTS, please delete the following reference:
"EP    0 545 619 A2   6/1993" and insert the following reference:
-- EP   0 545 629 A2   6/1993 --

Column 1,
Line 13, please delete "join", and insert therefor -- joint --.

Column 4,
Line 60, please delete "26", and insert therefor -- 24 --.

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.      : 6,511,380 B1
DATED           : January 28, 2003
INVENTOR(S)     : Hans Oetiker It is certified that error appears in the above-identified patent and that said Letters Patent is hereby corrected as shown below:

Column 5,
Line 59, please delete "a connection", and insert therefor -- a joint connection --

Signed and Sealed this

Thirty-first Day of August, 2004

JON W. DUDAS
*Director of the United States Patent and Trademark Office*